Patented Oct. 14, 1952

2,614,109

UNITED STATES PATENT OFFICE 2,614,109

ALKYL SULFONE DERIVATIVES OF 1:4-DI-AROYLAMINO 6:7-DICHLORO ANTHRA-QUINONES

Walter Jenny, Reinach, and Walter Kern, Sissach, Switzerland, assignors to Ciba Limited, Basel, Switzerland, a Swiss firm No Drawing. Application July 17, 1950, Serial No. 174,366. In Switzerland July 22, 1949

7 Claims. (Cl. 260—372)

1

This invention is based on the observation that valuable vat dyestuffs are produced when a 1-benzoylamino - 4 - amino-6:7-dichloranthraquinone is reacted with a benzoylating agent with the formation of a product benzoylated in 1- and 4-position, the reactants being so selected that one of the benzoyl radicals is substituted by an alkyl sulfone group.

The 1-benzoylamino - 4 - amino-6:7-dichloranthraquinones which may be substituted in the benzoyl radical, serving as starting materials for the present process can be obtained from 2:3-dichloranthraquinone by nitration and reduction, conversion of the 1-amino-6:7-dichloranthraquinone obtained into the oxamic acid, further nitration, splitting off of the oxalic acid radical, benzoylation and reduction. More detailed directions are hereinafter set forth in connection with Example 1.

The selection of the starting materials must be such that an alkyl sulfone group is present as substituent either in that benzoyl radical already present in the anthraquinone component, or in that benzoyl radical which is introduced by the present process into the anthraquinone derivative. The benzoyl radical other than the above specified radical substituted by the alkyl sulfone group can be free from substituents or may contain a substituent such as usually occurs in vat dyestuffs, for example an alkyl group such as the methyl group, an alkoxy group such as the ethoxy or methoxy group and especially a halogen atom such as chlorine or bromine. However an alkyl sulfone group must only be present in one of the two benzoyl radicals so that the dyestuffs obtained are unsymmetrical.

The alkyl sulfone groups are suitably in meta- or para-position to the CO-group of the benzoyl radical and may contain as alkyl radicals advantageously those with about 1–5 carbon atoms.

As examples of anthraquinone components which contain no alkyl sulfone-benzoylamino group and are therefore to be treated by the present process with benzoylating agents containing alkyl sulfone groups, may be mentioned 1-benzoylamino - 4 - amino-6:7-dichloranthraquinone, 1-(4′-methoxybenzoylamino)- and 1-(4′-chloro-benzoylamino) - 4 - amino-6:7-dichloranthraquinone. As benzoylating agents there are suitably concerned reactive derivatives of the corresponding benzoic acids, for example the acid chlorides, as for example those of 3- or 4-methylsulfone benzoic acid, 4-isopropylsulfone- or 4-n-butyl-sulfone benzoic acid. Conversely the same dyestuffs can be produced from the corresponding 1-(alkylsulfonebenzoylamino) - 4 - amino-6:7-dichloranthraquinones and benzoyl chloride, p-

2 methoxy- or p-chloro-benzoyl chloride, whereas the reaction, which takes place simultaneously, of 1:4-diamino-6:7-dichloranthraquinone with the corresponding benzoylating agents, in general yields substantial proportions of the less valuable symmetrical dyestuffs.

The treatment with the benzoylating agents concerned can be carried out for example in high boiling solvents such as dichlorobenzene, nitrobenzene or naphthalene, suitably at temperatures above 100° C., if desired with the addition of acid-binding and/or catalytically active agents such as pyridine, diethylaniline and sodium carbonate.

The vat dyestuffs obtained correspond to the general formula

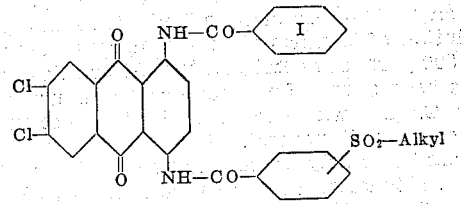

in which the benzene radical indicated by I may be substituted. In particular they may correspond to the general formula

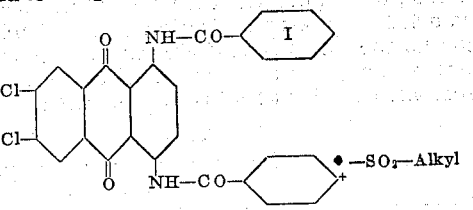

in which the $SO_2$-alkyl group is attached to one of the positions indicated by + and in which the benzene nucleus indicated by I may be substituted. They can be used as pigment dyestuffs and also for the dyeing and printing of a wide variety of fibers, especially those of vegetable nature such as cotton, linen, artificial silk and staple fiber from regenerated cellulose. They can also, if desired, be applied in the form of their leuco ester salts, which can be produced in the usual manner, employing a process known for this class of dyestuff.

The following examples illustrate the invention, the parts and percentages being by weight unless otherwise stated and the relation between parts by weight and parts by volume being the same as that between the kilogram and the liter:

EXAMPLE 1

20 parts of 3-methylsulfone-benzoic acid are suspended in 300 parts of dry nitrobenzene and after the addition of 15 parts of thionyl chloride and 0.1 part of pyridine, the whole is stirred for 1½ hours at 110–115° C. Thereupon 31 parts of 1-benzoylamino-4-amino-6:7-dichloranthraquinone are introduced and stirring continued for a further two hours at 125–130° C. The dyestuff of the formula

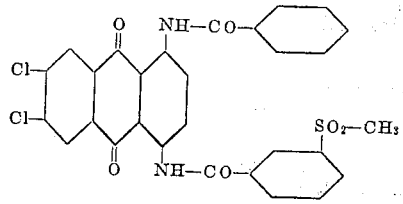

which on cooling is deposited in dark red small crystals, is filtered with suction, washed with nitrobenzene and boiling alcohol and dried. It dissolves in concentrated sulfuric acid with red-violet color and dyes cotton from an olive-green vat in pure blue-red shades of excellent fastness to light.

A similar dyestuff is obtained by the acylation with 4-isopropyl sulfone benzoic acid. Acylation with 4-n-butylsulfone benzoic acid gives a dyestuff which dyes cotton from an olive-green vat in pink shades.

The 1-benzoylamino-4-amino-6:7-dichloranthraquinone used in the present example can be produced as follows:

Within one hour 115 parts of nitration acid (a mixture of 57.5 parts of anhydrous $H_2SO_4$ and 57.5 parts of nitric acid of 98 per cent. strength) are gradually added with stirring to a solution of 50 parts of 2:3-dichloranthraquinone in 800 parts of monohydrate. After this mixture has been stirred for a further two hours at 50–55° C., the whole is filtered with suction and washed until neutral. The filter cake is now ground as finely as possible with a little 50 per cent. alcohol and after the addition of 30 parts of sodium sulfite and 3000 parts of water, boiled for 15 hours under reflux. The whole is then rendered alkaline with caustic soda solution, filtered hot and the product washed until neutral and dried. By recrystallization from o-dichlorobenzene the 1-nitro-6:7-dichloranthraquinone is obtained in practically colorless small needles which melt at about 290° C. (uncorrected).

Analysis

|   | Calculated | Found |
|---|---|---|
|   | Percent | Percent |
| C | 52.2 | 52.18 |
| H | 1.56 | 1.54 |
| N | 4.34 | 4.32 |
| Cl | 22.02 | 22.11 |

30 parts of nitro product are well ground with water and after the addition of 1400 parts of water and 300 parts of sodium hydrosulfide solution (30 per cent.), stirred for one hour at 95° C. The amino compound of the formula

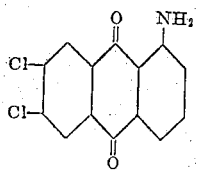

deposited as a red precipitate, is filtered hot with suction, washed neutral and dried. It crystallizes from anisole in small red needles which melt at about 282–283° C. (uncorrected).

Analysis

|   | Calculated | Found |
|---|---|---|
|   | Percent | Percent |
| C | 57.5 | 57.35 |
| H | 2.42 | 2.36 |
| N | 4.8 | 4.63 |
| Cl | 24.3 | 24.18 |

29.8 parts of the oxamic acid of the above 1-amino-6:7-dichloranthraquinone, produced in known manner, are dissolved in 300 parts of concentrated sulfuric acid at 5–10° C. To this solution at the same temperature with stirring 13 parts of nitric acid (65 per cent.) in 25 parts of concentrated sulfuric acid are very gradually added. After the whole has been stirred for a further three hours at 0–5° C., it is poured into 1500 parts of cold water and the product filtered with suction and washed until neutral. The filter cake is suspended in 1000 parts of water and after the addition of 30 parts of sodium carbonate stirred for two hours at 90–95° C., filtered hot with suction, washed until neutral and dried. When recrystallized from anisole or nitrobenzene 1-amino-4-nitro-6:7-dichloranthraquinone is obtained in small red needles.

Analysis

|   | Calculated | Found |
|---|---|---|
|   | Percent | Percent |
| N | 8.3 | 8.20 |
| Cl | 21.07 | 20.91 |

135 parts of 1-amino-4-nitro-6:7-dichloranthraquinone and 90 parts of benzoyl chloride are stirred in 840 parts of dry nitrobenzene for three hours at 135–140° C. On cooling, the benzoylamino compound is deposited in small greenish-yellow crystals. By reduction by the customary methods 1-benzoylamino-4-amino-6:7-dichloranthraquinone is obtained as a violet powder which dissolves in concentrated sulfuric acid with a red-violet color.

1-benzoylamino-4-amino-6:7-dichloranthraquinone can likewise be produced by monobenzoylation of 1:4-diamino-6:7-dichloranthraquinone.

EXAMPLE 2

16 parts of 4-methylsulfone-benzoic acid are suspended in 420 parts of dry nitrobenzene and after the addition of 12 parts of thionyl chloride and 0.1 part of pyridine, stirred for 1½ hours at 115–120° C. Thereupon 33 parts of 1-(4'-methoxy-benzoylamino)-4-amino-6:7-dichloranthraquinone are introduced and the whole further stirred for two hours at 125–130° C. The dyestuff of the formula

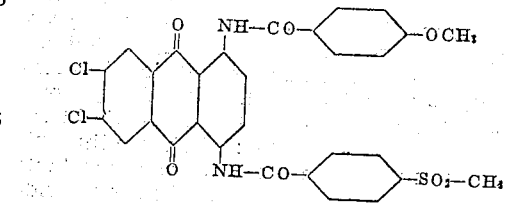

which on cooling is deposited in dark red small crystals, is filtered with suction, washed with nitrobenzene and hot alcohol and dried. It dissolves in concentrated sulfuric acid with a brown color and dyes cotton from an olive-green vat in red-violet shades.

1-(4'-methoxy-benzoylamino)-4-amino-6:7- dichloranthraquinone can be produced according to either of the two methods given in Example 1, last but one and last paragraph.

EXAMPLE 3

16 parts of 4-methylsulfone-benzoic acid are distributed in 360 parts of dry nitrobenzene and after the addition of 12 parts of thionyl chloride and 0.1 part of pyridine the whole stirred for 1½ hours at 105–110° C. Thereupon 33 parts of 1 - (4'-chlorobenzoylamino) -4-amino-6:7-dichloranthraquinone are introduced and the whole stirred for a further two hours at 125–130° C. The dyestuff of the formula

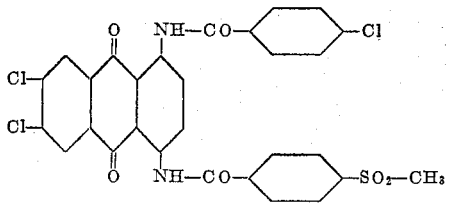

which on cooling is deposited in small dark red needles, is filtered with suction, washed with nitrobenzene and hot alcohol and dried. It dissolves in concentrated sulfuric acid with a blue-red color and dyes cotton from an olive-green vat in bluish-red shades.

1-(4'-chlorobenzoylamino) - 4 - amino-6:7-dichloranthraquinone can be produced by either of the methods given in Example 1, last but one and last paragraph.

EXAMPLE 4

2 parts of the dyestuff obtained according to the first paragraph of Example 1 and pasted by reprecipitation from sulfuric acid, are vatted with 4 parts of sodium hydrosulfite and 8 parts by volume of caustic soda solution of 36° Bé. in 200 parts of water at 50° C. A dyebath is prepared which contains in 2000 parts of water 2 parts of sodium hydrosulfite and 4 parts by volume of caustic soda solution of 36° Bé. and the above stock vat is added to the dyebath. Thereupon 100 parts of cotton are entered at 25° C. and after 15 minutes 40 parts of sodium chloride are added and dyeing carried out for one hour at 25–30° C. The cotton is then squeezed out, oxidized in the air, rinsed, acidified, rinsed again and if desired soaped at the boil. It is dyed in fast pure blue-red shades.

What we claim is:

1. An asymmetrical vat dyestuff of the general formula

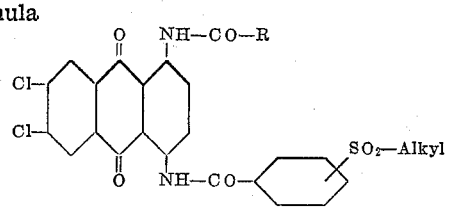

wherein R stands for a mononuclear aryl radical.

2. An asymmetrical vat dyestuff of the general formula

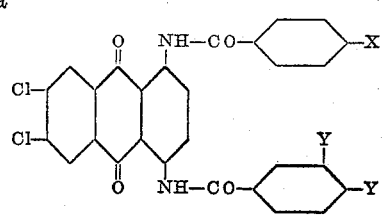

wherein X stands for a substituent selected from the group consisting of hydrogen, halogen, and an alkoxy group, one Y stands for hydrogen and the other Y stands for an —$SO_2$-alkyl radical, the alkyl group of which contains up to 5 carbon atoms.

3. The vat dyestuff of the formula

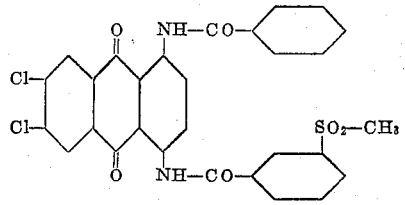

4. The vat dyestuff of the formula

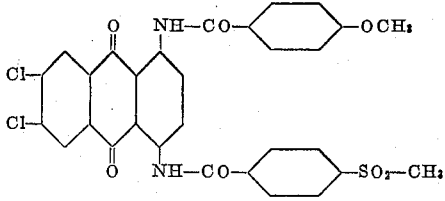

5. The vat dyestuff of the formula

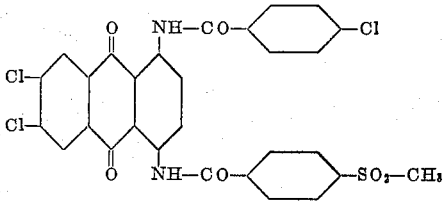

6. The vat dyestuff of the formula

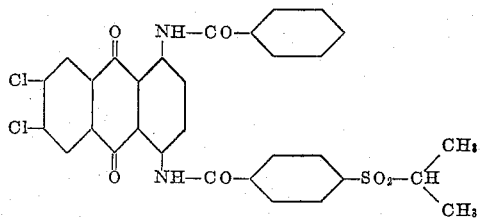

7. The vat dyestuff of the formula

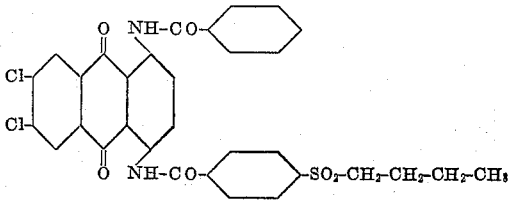

WALTER JENNY.
WALTER KERN.

REFERENCES CITED

The following references are of record in the file of this patent:

UNITED STATES PATENTS

| Number | Name | Date |
|---|---|---|
| 2,190,751 | Zerweck et al. | Feb. 20, 1940 |

OTHER REFERENCES

Elsivier's Encyclopedia of Organic Chemistry, vol. 13, pages 458 and 422 (1946).